Figure 1:
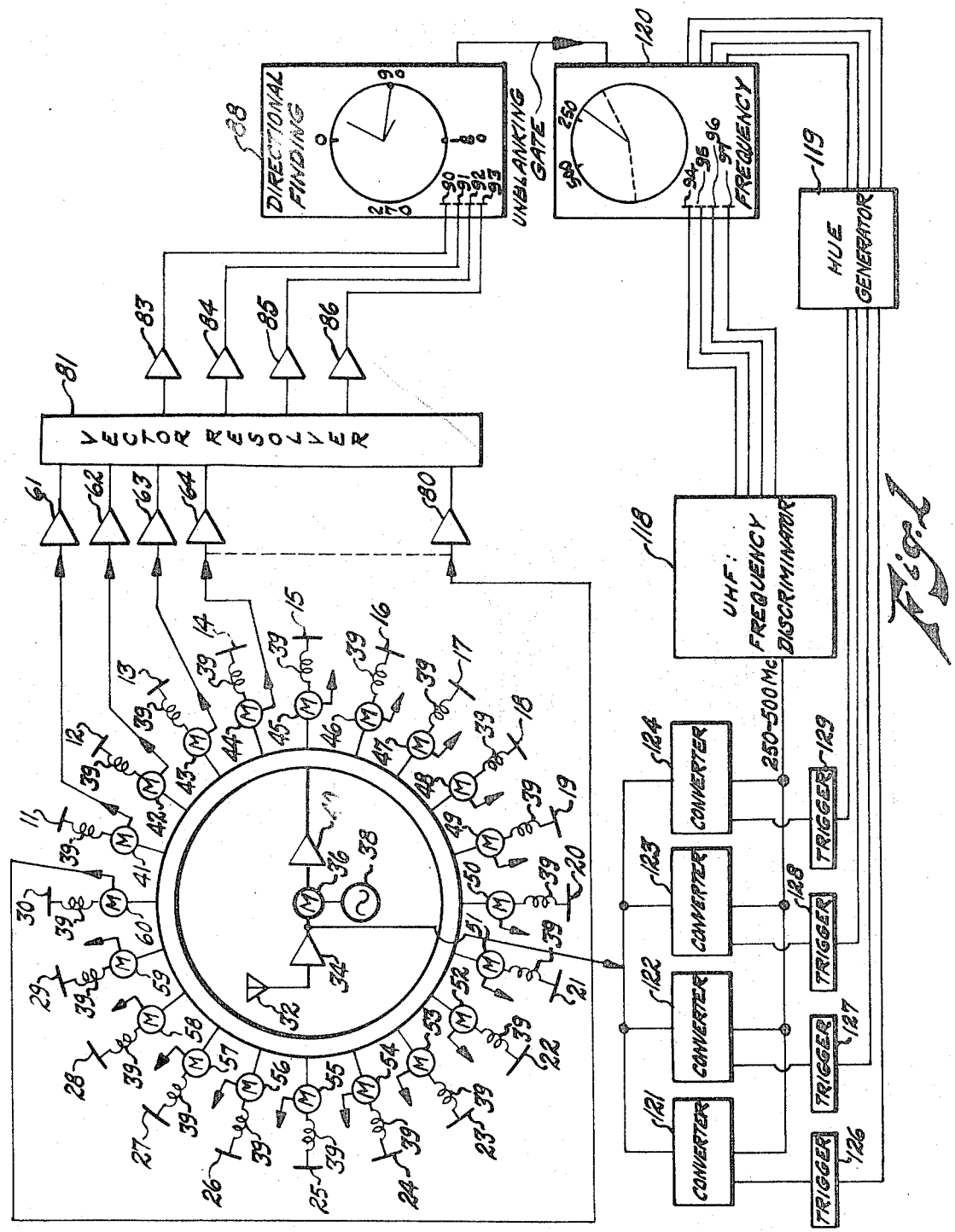

United States Patent [19]

Blymiller et al.

[11] 3,787,864

[45] Jan. 22, 1974

[54] INSTANTANEOUS SIGNAL RESOLUTION SYSTEM

[75] Inventors: Arthur L. Blymiller, Rome; John E. Snodgrass, Oneida, both of N.Y.

[73] Assignee: The United States of America as represented by the Secretary of the Air Force, Washington, D.C.

[22] Filed: July 12, 1967

[21] Appl. No.: 653,307

[52] U.S. Cl.............. 343/113 R, 324/79, 343/119, 343/123
[51] Int. Cl............................................. G01s 3/14
[58] Field of Search ....... 343/113, 119, 123; 324/79

[56] References Cited
UNITED STATES PATENTS

| | | | |
|---|---|---|---|
| 2,489,304 | 11/1949 | Marchand et al............ | 343/113 UX |
| 2,525,679 | 10/1950 | Hurvitz........................... | 324/79 X |
| 3,060,427 | 10/1962 | Jaffe et al. ...................... | 343/113 X |

Primary Examiner—Benjamin A. Borchelt
Assistant Examiner—Richard E. Berger
Attorney, Agent, or Firm—Harry A. Herbert, Jr.; Julian L. Siegel

[57] ABSTRACT

An apparatus for simultaneously and instantaneously determining direction and frequency of an unknown transmitted signal which is received by an omnidirectional antenna and mixed with a local oscillator, the output of which is again mixed in a plurality of mixers each fed by one of a plurality of directional antennas in a circular configuration. The output of the plurality of mixers, being the intermediate frequency, is fed into a vector resolver which controls deflection plates of a CRT and indicates the direction of the signal. The output of the omnidirectional antenna is also fed to a bank of frequency converters, each converter adapted to pass a section of the bandwidth being examined. The bandwidth section having the unknown signal triggers a hue generator controlling a CRT while a frequency discriminator determines the frequency and displays it on a CRT.

4 Claims, 2 Drawing Figures

INSTANTANEOUS SIGNAL RESOLUTION SYSTEM

This invention relates to the resolution of electromagnetic signals and more particularly to the determination of direction and frequency instantaneously and simultaneously.

In the collection of data for electronic warfare and intelligence purposes, certain types of transmissions cannot be collected by utilization of present intercept techniques. Exotic types of transmissions can baffle intercept and collection machinery by simply changing the frequency of transmission within very short time periods. In some cases where the emitter is airborne, a change of status (frequency and directional bearing) can be further utilized to confuse the intercept equipment. It is therefore necessary to have a system that will provide for the intercept and the analyzing of electromagnetic transmissions within extremely short time periods. In order to obtain the above objectives, it is necessary to examine the three domains in which all intercept techniques and equipment may function. All instantaneous intelligence data collection concepts must be and are limited to the three domains of (a) space (determination of angle of arrival); (b) frequency (determination of frequency of transmission), and (c) time (determination of time of arrival).

If a technique can be devised to optimally utilize all three domains simultaneously with optimum correlation, then the intercept and collection of signal transmission is as perfect as can be obtained. This invention utilizes a method in which several techniques are combined in a process to accomplish the above. While this method utilizes several basic concepts, one of which has already been the subject of a patent application by the present inventors, this invention will embody the refinement in an intercept receiver and the correlation with instantaneous direction finding methods. The integration of these techniques with proper refinement constitutes the concept for which a signal from a totally uncontrolled and unknown emitter can be intercepted and resolved upon the first burst of energy from the emitter and represents the first concept in the utilization of the three domains (space, frequency, and time) to process signal information in the real time sequence.

To emphasize and evaluate the requirement for instantaneous signal resolution, it is necessary to examine the need for real time signal processing. In electronic warfare and intelligence collection field several types of information concerning transmission from enemy emitters are generally known. However, the arrival angle (DF), the exact frequency and the time must be considered parameters which any potential enemy can vary to confuse the collecting devices. In other words, signal collection of electromagnetic transmissions from an unknown and uncontrolled emitter is an extremely difficult problem and this problem has additional magnitude with respect to frequency jumping radar which is a technique for active defense, navigation, bombing, mapping, and assessment electronic weapons. The ability to shift frequency on a pulse-to-pulse basis provides a radar that is not vulnerable to interception by the usual intelligence collection devices.

Other radar techniques such as multiple frequency concepts can also be stated as a problem in the intelligence collection field. Here, a single radar utilizing several frequencies provides a current detection problem. The intercept difficulty is further increased if such weapon has the capability to change frequency even periodically. These exotic types of emitters require a new concept of intelligence collection if adequate information is to be obtained. Instantaneous signal resolution over wide frequency and space domains must be accomplished to solve the problem.

The instantaneous resolution of signal transmissions in the three domains must have the following characteristics or functions: (a) must be receptive to transmission over a wide band (wide open in frequency); (b) must be receptive to transmission over the full azimuth (wide open in DF); and (c) must have instantaneous correlation of the above characteristics.

The technique of this invention accomplishes the stated functions by coupling an instantaneous multibeam direction finding concept with an instantaneous frequency concept and analysis technique. While the refinements such as the homodyne principle and the heterodyne principle are employed, the technique is not dependent on these to meet the functions. However, as these do offer enhancement, the technique will encompass this in the invention. A version of the homodyne principle is utilized to provide wide instantaneous directional finding with increased sensitivity without complexity. The frequency determination section utilizes a heterodyne process to provide coverage and sensitivity.

It is thereofre an object of this invention to provide a system for instantaneously determining direction of an unknown signal.

It is another object to provide a system for determining instantaneously the frequency of an unknown signal.

It is still another object to provide a system for instantaneously determining both the direction and the frequency of an unknown signal simultaneously.

Figure 2:
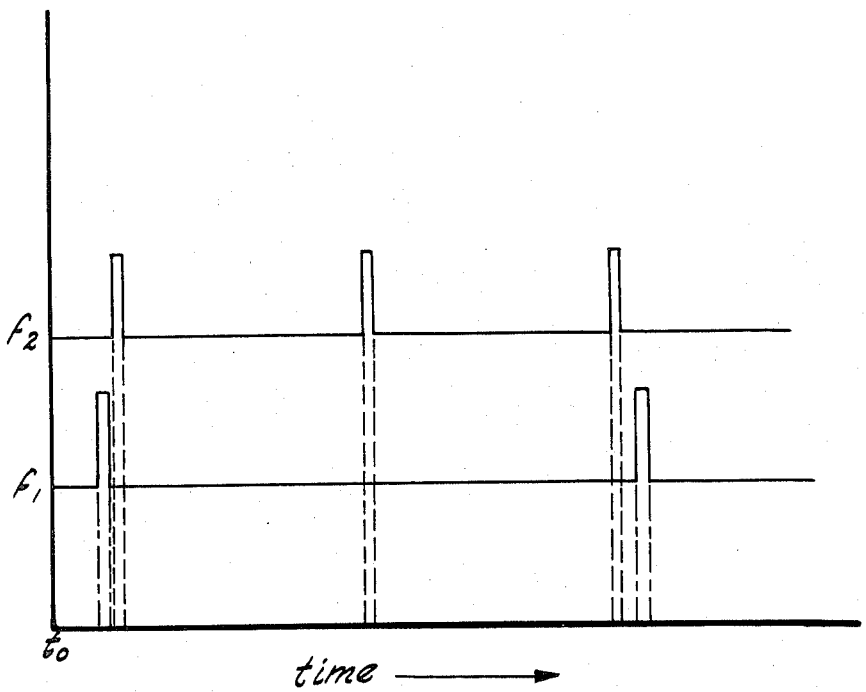

These and other advantages, features and objects of the invention will become more apparent from the following description taken in connection with the illustrative embodiments in the accompanying drawings, wherein:

FIG. 1 is a block diagram of an embodiment of the invention;

and FIG. 2 is a diagram to aid in explanation in the use of the invention when resolving two signals of different frequencies.

Referring to FIG. 1, there is shown a circular array of twenty directional antenna elements 11–30 and one omnidirectional antenna element 32. The number is not critical but increasing the number will increase the resolution and decreasing it will have a degradation effect. Omnidirectional antenna 32 centrally located intercepts all signals and amplifies them in a low noise broad band traveling wave tube 34. The signals are mixed in mixer 36 with a fixed frequency from oscillator 38, which frequency will eventually be the IF frequency. Signals minus the local oscillator frequency are further amplified by traveling wave tube 40 to a level suitable for distribution to all directional finding mixers 41–60, which perform a differencing function resulting in:

$$f_s - (f_s - f_{LO}) = f_{LO} = f_{DFO}.$$

$f_s$ = signal frequency (intercept)
$f_{LO}$ = crystal control local oscillator
$f_{DFO}$ = direction finder oscillator frequency.

Precision delaying devices 39 of all DF channels by an amount equal to the time required for generation of the $f_{DFO}$ insures simultaneous arrival of the intercept signal $f_s$ and the $f_{DFO}$ at DF mixers 41–60. The prime requirement for system performance is channel balance. Equality in phase amplitude distribution of the self-generated local oscillator 38 to all DF mixers 41–60 is a firm requirement. Mixer 41 is connected to IF amplifier 61, mixer 42 is connected to IF amplifier 62; . . . and mixer 60 is connected to IF amplifier 80. As a signal arriving at the system of antennas will be intercepted by several channels with amplitudes varying according to the angle of arrival, it is possible to apply a weighing factor to the various channels in terms of their angular location in the array. Vector components are derived for each signal arriving at the antenna by vector resolver 81 which is conventional and the vector addition of these components is accomplished by the deflection plates 90–93 after amplification by video amplifiers 83–86 of precision cathode ray tube 88 and the result is displayed as a strobe depicting the angle of arrival. This action is accomplished instantaneously utilizing the time as well as the space domain for space filtering with the resultant directional finding value handling capability established.

In addition to directional bearing it is necessary to obtain instantaneously the frequency of the signal intercept and correlate it with the directional finding information in a real time signal processing sequence. A basic technique to accomplish this function is the subject of my patent application entitled "Frequency Discriminator Device," now under Patent application Ser. No. 141,548, filed Sept. 28, 1961. Utilizing this technique with a method employing a multi-conversion process, a technique has been developed to receive and instantaneously determine the frequency of transmission. All signals intercepted by omnidirectional antenna 32 and amplified by traveling wave tube 34 are transferred to converter banks 121–124. For example, if a bandwidth of 1,000 mc is to be examined, then each converter covers a 250 mc section of the band. Four converters as shown can convert any 1,000 mc band of frequencies to a common 250 to 500 mc output. Frequency discriminator 118 then processes each pulse of energy and feeds it to deflection plates 94–97 and a strobe on cathode ray tube 120 will reset with a frequency determination accuracy of ± 0.5 mc. To identify which 250 mc segment of the band has been traversed by the signal, triggers 126–129 from converters 121–124 which pass the signal will drive hue generator 119 to provide a distinctive color display of each strobe. The periphery of the color cathode ray tube is calibrated in frequency with the color strobe identifying the converter.

The correlation between the directional finding and the frequency determination is accomplished by deriving trigger pulses from the direction finding intercept, which serves as an unblanking gate, and utilizing this energy to trigger the frequency determination section in a true real time process. Displays 120 and 188 provide instantaneously and simultaneously angle of arrival and the frequency of the carrier.

Emphasis must be placed on the fact that utilization of the time domain requires that the signal intercepted be of the burst variety (pulse modulated). An example of this is shown in FIG. 2 where two carriers of frequencies $f_1$ and $f_2$ are shown with the pulse train as received by the antennas. As both the directional finding and the frequency determination information is derived on the leading edge of each pulse, only a value of $\Delta t$ is required to distinguish between, resolve and/or filter the two targets. The fact that $\Delta t$ will nearly always be a sufficiently large value compared with pulse width provides the capability to filter in this domain where $\Delta t >$ PW. It is possible in high density areas to interleaf the pulses and at some time value produce synchronization. However, this condition cannot exist for any extended time period unless the emitters are being pulsed in synchronization.

What we claim is:

1. A system for instantaneously determining frequency and direction of an unknown radio signal in a given bandwidth comprising:
   a. an omnidirectional antenna;
   b. a local oscillator;
   c. a first mixer fed by the omnidirectional antenna and the local oscillator;
   d. a plurality of directional antennas arranged in a circular configuration;
   e. a plurality of directional mixers, one each fed by one each of the plurality of directional antennas and the output of the first mixer;
   f. a vector resolver fed by the outputs of each of the plurality of directional mixers;
   g. a directional finding cathode ray tube having deflection plates, the output of the vector resolver being connected to the deflection plates for displaying the direction of the unknown signal;
   h. a frequency discriminator fed by the omnidirectional antenna;
   i. and a frequency determination cathode ray tube having deflection plates, the outputs of the frequency discriminator being connected to the deflection plates for displaying the frequency of the unknown signal.

2. A system for instantaneously determining frequency and directional according to claim 1 which further comprises and interposed between the frequency discriminator-frequency cathode ray tube combination and the omnidirectional antenna:
   a. a plurality of frequency converters for converting the unknown signal to a common frequency band, each converter being capable of receiving one section of the given bandwidth;
   b. a hue generator connected to the frequency cathode ray tube for controlling the hue thereof;
   c. and means for triggering the hue generator upon an output of one of the plurality of frequency converters.

3. A system for determining frequency and direction of an unknown radio signal according to claim 1 which further comprises a plurality of delay circuits interposed between each of the plurality of directional antennas and the respective mixers for simultaneous arrival at the respective mixers of the first mixer output and the signal from each directional antenna.

4. A system for instantaneously determining frequency and direction for an unknown radio signal according to claim 1 which further comprises a trigger interposed between the directional cathode ray tube and the frequency cathode ray tube for synchronizing the cathode ray tube displays.

* * * * *